Feb. 23, 1926.  
W. R. HEDRICK  
1,574,390  
DEMOUNTABLE RIM  
Filed Oct. 6, 1925
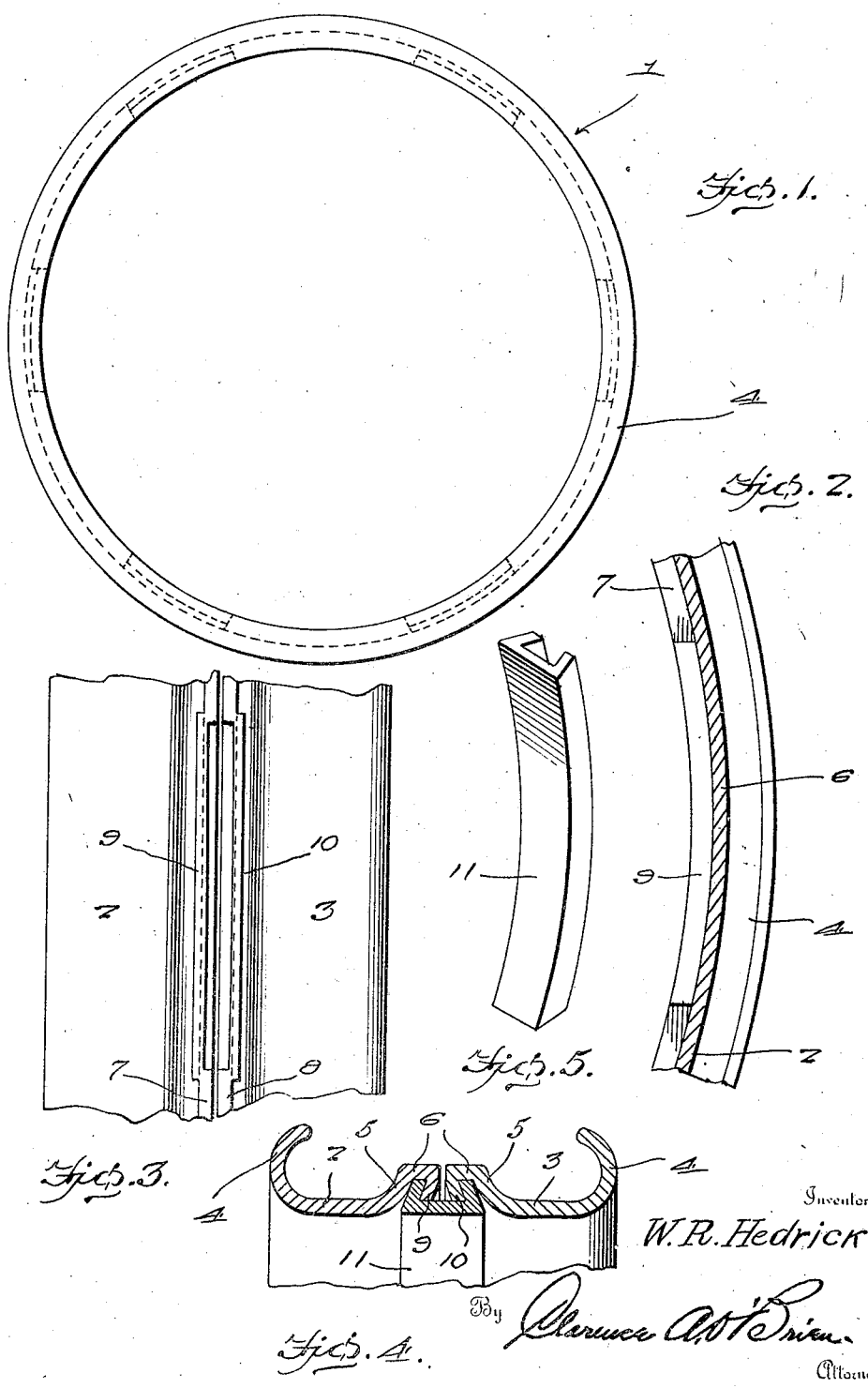

Patented Feb. 23, 1926.

1,574,390

UNITED STATES PATENT OFFICE.

WILLIAM RUFUS HEDRICK, OF ROANOKE, VIRGINIA.

DEMOUNTABLE RIM.

Application filed October 6, 1925. Serial No. 60,800.

*To all whom it may concern:*

Be it known that I, WILLIAM RUFUS HEDRICK, a citizen of the United States, residing at Forest Park, Roanoke, in the county of Roanoke and State of Virginia, have invented certain new and useful Improvements in a Demountable Rim, of which the following is a specification.

This invention relates to improvements in demountable rims and has for its principal object to provide a rim which is circumferentially divided to provide a pair of complementary rim sections, means being associated with said sections for securing the same in a locked position whereby a pneumatic tire may be properly supported on the rim.

A further object is to provide a demountable rim wherein the securing means for the complementary sections may be readily and easily moved to a locking or unlocking position for holding the rim in an assembled and disassembled manner respectively.

A further object is to provide a demountable rim which is simple in construction, inexpensive, and furthermore adapted to the purpose for which the same is designed.

Other objects and advantages of this invention will become apparent during the course of the following description.

In the accompanying drawing forming part of this specification, and in which like numerals are employed to designate like parts throughout the same:—

Figure 1 is a side elevation of the demountable rim embodying my invention,

Fig. 2 is a fragmentary detail section thru one of the complementary sections of the rim, showing one of the projecting portions of the flange formed on the inner edge of the section in side elevation, Fig. 3 is a bottom plan view of the complementary sections showing one pair of complementary outwardly disposed portions of the complementary flanges, and Fig. 4 is a transverse section through the demountable rim showing the manner in which the sections are secured together in a locked position, and Fig. 5 is a detail perspective view of one of the locking members.

In the drawing wherein for illustration is shown the preferred embodiment of my invention, the numeral 1 designates generally my improved demountable rim, the same being circumferentially divided to provide the complementary sections as 2 and 3 respectively. Each of the sections is provided with the out-turned bead engaging flange 4 at its outer remote edge as more clearly illustrated in Fig. 4.

The inner edge portion of each of the complementary sections is disposed outwardly as at 5 and thence laterally as at 6 and then inwardly so as to provide the inturned complementary flanges 7 and 8 at the inner or joining edges of the sections 2 and 3 respectively.

Portions of these inturned complementary flanges 7 and 8 are slightly disposed laterally in an outward direction to provide the complementary laterally projecting portions 9 and 10 and the same are arranged at spaced intervals around the inner face of the rim as shown in Fig. 1. The purpose of the laterally exposed projecting portions of said inwardly disposed flanges will be presently described.

Cooperating with each pair of complementary laterally projecting portions 9 and 10 is a channel-shaped locking member 11, the same being curved longitudinally and of a length equal to the length of the laterally projecting portions 9 and 10. As further illustrated in the drawing, the sides of the channel-locking member gradually converge at their tops so as to provide a substantially dove-tailed channel in cross section. The laterally projecting portions 9 and 10 are also disposed in such a manner as to provide a dove-tailed shaped tongue for cooperation with the dove-tailed channel of the locking member 11. This is clearly shown in Fig. 4.

In assembling the circumferentially divided rim, the complementary sections are arranged so that the inwardly turned flanges 7 and 8 are arranged in substantially abutting relation and furthermore in such a manner as to have each pair of laterally projecting portions 9 and 10 in alinement. The locking members 11 are then placed over the edges of the flanges 7 and 8 between the several pairs of laterally projecting portions 9 and 10, and then by sliding each of the locking channel-shaped members circumferentially, the same will be disposed over the respective pairs of the laterally projecting portions 9 and 10 of the flanges 7 and 8, and when the parts are arranged as shown in Fig. 4, the channel-shaped locking members will cooperate with the laterally projecting portions 9 and 10 in securing the complementary sections of the rim together, whereby a pneumatic tire will be held in proper position on the rim. By curving each of the locking channel-shaped members longitudinally, the same will be adapted to conform to the shape of the inner face of the rim to fit snugly thereagainst and prevent any looseness or play between the locking members and the rim.

It is also to be understood that the rim is provided with a suitable opening for accomodating the valve stem of the inner tube associated with the pneumatic tire in the manner well known in the art.

The provision of the demountable rim of the above mentioned character enables the same to be readily assembled or disassembled and when the locking members are disposed over the laterally projecting portions of the inwardly turned flanges of the sections of the rim, there will be no possibility of said sections becoming separated and as a result causing the inner sides to become unseated.

While I have shown the preferred embodiment of my invention, it is to be understood that various changes in the size, shape and arrangement of parts may be resorted to without departing from the spirit or scope of the appended claims.

Having thus described my invention, what I claim as new is:

1. A demountable rim comprising a pair of complementary rim sections, complementary inturned flanges formed on the inner edges of the sections, said flanges being disposed outwardly at spaced intervals to provide pairs of lateral projections, and a series of channel-shaped locking members slidable on the aforementioned flanges and adapted to extend over the respective pairs of lateral projections for securing the rim sections together.

2. A demountable rim comprising a pair of complementary rim sections, the inner edge portion of each section being disposed outwardly, and laterally, and thence inwardly to provide complementary inturned flanges on the inner edges of the sections, said flanges being disposed outwardly at spaced intervals to provide pairs of lateral projections, and a series of channel-shaped locking members mountable on the aforementioned flanges and adapted to extend over the respective pairs of lateral projections for securing the rim sections together.

3. A demountable rim comprising a pair of complementary rim sections, the inner edge portion of each section being disposed outwardly, and laterally, thence inwardly to provide complementary inturned flanges on the inner edges of the sections, said flanges being disposed outwardly at spaced intervals to provide pairs of lateral projections, and a series of channel-shaped locking members mountable on the aforementioned flanges and adapted to extend over the respective pairs of lateral projections for securing the rim sections together, the sides of each channel-shaped locking member being disposed between the outwardly and inturned portions of the edge portions of the respective sections.

In testimony whereof I affix my signature.

WILLIAM RUFUS HEDRICK.